(12) United States Patent
Yu et al.

(10) Patent No.: US 11,624,976 B2
(45) Date of Patent: Apr. 11, 2023

(54) SYSTEM AND METHOD FOR DYNAMICALLY ADJUSTING COLOR GAMUT OF DISPLAY SYSTEM, AND DISPLAY SYSTEM

(71) Applicant: APPOTRONICS CORPORATION LIMITED, Guangdong (CN)

(72) Inventors: Xin Yu, Shenzhen (CN); Fei Hu, Shenzhen (CN); Xianpeng Zhang, Shenzhen (CN); Zuqiang Guo, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 74 days.

(21) Appl. No.: 17/272,162

(22) PCT Filed: Mar. 1, 2019

(86) PCT No.: PCT/CN2019/076632
§ 371 (c)(1),
(2) Date: Feb. 26, 2021

(87) PCT Pub. No.: WO2020/042566
PCT Pub. Date: Mar. 5, 2020

(65) Prior Publication Data
US 2021/0341825 A1    Nov. 4, 2021

(30) Foreign Application Priority Data
Aug. 31, 2018 (CN) .......................... 201811014353.1

(51) Int. Cl.
*G03B 21/20* (2006.01)
(52) U.S. Cl.
CPC ....... *G03B 21/2053* (2013.01); *G03B 21/204* (2013.01)

(58) Field of Classification Search
CPC ...... G03B 21/20; G03B 33/10; G03B 21/204; G03B 21/2053; H04N 9/31; H04N 9/3158;
(Continued)

(56) References Cited

U.S. PATENT DOCUMENTS 10,466,580 B2 * 11/2019 Guo .................... H04N 9/3102
11,215,909 B2 *  1/2022 Hu ...................... G02B 26/008
(Continued)

FOREIGN PATENT DOCUMENTS

CN        102566230        7/2012
CN        105022212        11/2015
(Continued)

OTHER PUBLICATIONS

International Search Report for International Application PCT/CN2019/076632, dated May 29, 2019.
(Continued)

*Primary Examiner* — Magda Cruz
(74) *Attorney, Agent, or Firm* — Burris Law, PLLC

(57) ABSTRACT

A system and method for dynamically adjusting a color gamut of a display system, and a display system are provided. The display system includes a light source system and an imaging system. The light source system includes an excitation light source and a narrow-spectrum primary-light source. The imaging system includes a spatial light modulation device and the system for dynamically adjusting the color gamut. The excitation light source emits excitation light which is processed to output at least one broad-spectrum primary light. The narrow-spectrum primary light source outputs narrow-spectrum primary light. The narrow-spectrum primary light and the broad-spectrum primary light are combined and then output to the imaging system. The
(Continued)

brightness of light emitted by the excitation light source and the narrow-spectrum primary light source is adjusted.

20 Claims, 5 Drawing Sheets

(58) Field of Classification Search
CPC ... H04N 9/3161; H04N 9/3164; H04N 9/3182
See application file for complete search history.

(56) References Cited

U.S. PATENT DOCUMENTS

| | | | |
|---|---|---|---|
| 2010/0128226 A1 | 5/2010 | Shibasaki | |
| 2012/0099084 A1 | 4/2012 | Toyooka et al. | |
| 2014/0028699 A1* | 1/2014 | Kurtz | H04N 9/3182 345/590 |
| 2015/0316775 A1 | 11/2015 | Hsieh et al. | |
| 2018/0080630 A1* | 3/2018 | Wang | G03B 21/2013 |
| 2019/0004410 A1* | 1/2019 | Suzuki | G09G 3/02 |
| 2021/0134208 A1* | 5/2021 | Yu | G09G 3/2003 |
| 2021/0136337 A1* | 5/2021 | Yu | G03B 21/204 |
| 2021/0149287 A1* | 5/2021 | Hu | G03B 33/00 |
| 2021/0383766 A1* | 12/2021 | Yu | G03B 21/20 |

FOREIGN PATENT DOCUMENTS

| | | |
|---|---|---|
| CN | 106154715 | 11/2016 |
| CN | 106200229 | 12/2016 |
| CN | 106353956 | 1/2017 |
| CN | 106842785 | 6/2017 |
| CN | 106855679 | 6/2017 |
| CN | 106918981 | 7/2017 |
| CN | 107852484 | 3/2018 |
| CN | 108279548 | 7/2018 |
| JP | 2006086788 | 3/2006 |
| WO | 2017033369 | 3/2017 |

OTHER PUBLICATIONS

Extended European Search Report issued in corresponding EP Application 19854599.8, dated Sep. 15, 2021.

* cited by examiner

SYSTEM AND METHOD FOR DYNAMICALLY ADJUSTING COLOR GAMUT OF DISPLAY SYSTEM, AND DISPLAY SYSTEM

CROSS-REFERENCE TO RELATED APPLICATIONS

This application is a National Stage application of International Application No. PCT/CN2019/076632, filed on Mar. 1, 2019, which claims priority to and the benefit of CN 201811014353.1, filed on Aug. 31, 2018. The disclosures of the above applications are incorporated herein by reference.

FIELD

The present disclosure relates to a display system and, in particular, to a projection system and method for dynamically adjusting a color gamut of a display system, and a display system.

BACKGROUND

The statements in this section merely provide background information related to the present disclosure and may not constitute prior art.

In a basic laser phosphor source, phosphor powder on a wavelength conversion device is excited by short-wavelength visible light of the laser, to generate sequential primary-color fluorescence or white light. However, due to a wide spectrum of fluorescence, the phosphor source covers a narrow color gamut. In an improved laser phosphor source, the short-wavelength visible light of the laser is converted into primary-color light by a wavelength conversion device, and the primary-color light is then filtered by a synchronous filtering device to obtain primary-color light with a narrow band and higher color purity to expand the color gamut of laser fluorescence. In this scheme, the filtering device will bring additional optical power loss, which reduces an efficiency of this light source.

In a further improvement of the laser phosphor source system, pure red-green laser is incorporated into the laser fluorescence to expand the color gamut of the light source. This scheme can refer to the US Patent Application Publication No. 20150316775A1 and the Chinese Patent Application No. 201110191454.8. Although the color gamut of laser fluorescence can be expanded by incorporating the pure color laser light, this scheme does not involve an adjustment of a light source proportion for the display content when the light source is applied to the display system. Thus, the color gamut is expanded in a limited range. In addition, if the color gamut of the laser fluorescence needs to be expanded to a DCI-P3 standard, a pure-color laser light equivalent to 40% of fluorescence luminance needs to be added. Therefore, red-green laser light with high power needs to be added, which greatly increases the system cost.

In order to expand the color gamut, another scheme includes: adding sufficient red-green laser light and disposing a filtering device to improve color saturation of red-green fluorescence. In this way, fluorescence and laser light can be combined to obtain primary-color light with the color gamut in rec2020 standard. However, in addition to a high cost, this scheme also greatly reduces an efficiency (a typical proportion of red-green fluorescence is approximately 30%, and thus the efficiency of the system is reduced by over 30%).

SUMMARY

This section provides a general summary of the disclosure and is not a comprehensive disclosure of its full scope or all of its features.

In view this, a projection system and method for dynamically adjusting a color gamut of a display system, and a display system are provided according to the present disclosure, such that increased cost and reduced efficiency when the color gamut is expanded are inhibited.

In a first aspect, a system for dynamically adjusting a color gamut of a display system is provided according to the present disclosure, wherein the display system includes a light source system and an imaging system, the light source system includes an excitation light source and a narrow-spectrum primary-color light source, the imaging system includes a spatial light modulation device and the system for dynamically adjusting the color gamut of the display system, wherein the excitation light source emits excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system; the imaging system includes a processing device, a storage device and a spatial light modulation device; and the system for dynamically adjusting the color gamut of the display system is stored into the storage device and executed by the processing device; and the system for dynamically adjusting the color gamut of the display system includes: a light source luminance adjustment module, where the light source luminance adjustment module includes a brightest pixel point acquisition module configured to calculate color coordinates and luminance of a pixel point with a maximum luminance in a frame of the image; a broad-spectrum primary-color light luminance generation module configured to calculate a desired minimum luminance (e.g., a required minimum luminance) of the broad-spectrum primary-color light based on color coordinates and luminance of the primary-color light outputted by the light source system and the color coordinates and the luminance of the pixel point with the maximum luminance, and to calculate a luminance control value for controlling the excitation light source based on the desired minimum luminance of the broad-spectrum primary-color light; a narrow-spectrum primary-color light luminance generation module configured to calculate a desired luminance of the narrow-spectrum primary-color light based on the desired minimum luminance of the broad-spectrum primary-color light, and to calculate a luminance control value for controlling the narrow-spectrum primary-color light source based on the desired luminance of the narrow-spectrum primary-color light; and a luminance signal output module configured to generate a light source luminance signal of the excitation light source based on the luminance control value of the broad-spectrum primary-color light and generate a light source luminance signal of the narrow-spectrum primary-color light source based on the luminance control value of the narrow-spectrum primary-color light, and to output the light source luminance signals to the excitation light source and the narrow-spectrum primary-color light source respectively to adjust luminance of light emitted by the excitation light source and luminance of light emitted by the narrow-spectrum primary-color light source.

In a second aspect, a method for dynamically adjusting a color gamut of a display system is provided according to the present disclosure, the display system including a light source system and an imaging system, the imaging system comprising a spatial light modulation device, wherein the light source system includes an excitation light source and a narrow-spectrum primary-color light source, the excitation light source outputs excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system; and where the method includes: calculating color coordinates and luminance of a pixel point with the maximum luminance in a frame of an image; calculating a desired minimum luminance of the broad-spectrum primary-color light, based on color coordinates and luminance of primary-color light outputted by the light source system and the color coordinates and the luminance of the pixel point with the maximum luminance; and calculating a luminance control value for controlling the excitation light source, based on the desired minimum luminance of the broad-spectrum primary-color light; calculating a desired luminance of the narrow-spectrum primary-color light, based on the desired minimum luminance of the broad-spectrum primary-color light; and calculating a luminance control value for controlling the narrow-spectrum primary-color source, based on the desired luminance of the narrow-spectrum primary-color light; and generating a light source luminance signal of the excitation light source based on the luminance control value for controlling the excitation light source and generating a light source luminance signal of the narrow-spectrum primary-color light source based on the luminance control value for controlling the narrow-spectrum primary-color light source; and outputting the light source luminance signals to the excitation light source and the narrow-spectrum primary-color light source respectively to adjust luminance of light emitted by the excitation light source and luminance of light emitted by the narrow-spectrum primary-color light source.

In a third aspect, a display system is provided according to the present disclosure, including a light source system and an imaging system, the light source system including an excitation light source and a narrow-spectrum primary-color light source, where the excitation light source outputs excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system; and wherein the imaging system includes a spatial light modulation device and the system for dynamically adjusting the color gamut of the display system described above.

For the system and method for dynamically adjusting the display system, and the display system according to forms of the present disclosure, on the one hand, the excitation light with better monochromaticity and broad-spectrum fluorescence are combined to form new primary-color light, thereby expanding the color gamut of the display system. On the other hand, the luminance of the brightest pixel point in the image is used to calculate the desired minimum luminance of the broad-spectrum primary-color light. Thus, the luminance of the broad-spectrum primary-color light is improved while maintaining the luminance of the image, so that the color gamut of the image can be expanded to the greatest extent. In addition, new color coordinates of the light source system is calculated by using the modulated luminance of primary-color illumination light; and a compensation matrix of the original signal of this frame of the image is calculated by the new color coordinates of the light source system, to compensate the original signal of this frame of the image to generate a control signal of each pixel point of the compensated image. The control signal is used to control output of the spatial light modulation device, thereby dynamically compensating chromatic aberration of each frame due to the change of color gamut according to the difference of each frame of the image. Therefore, the system and method for dynamically adjusting the color gamut of the display system, and the display system according to the forms of the present disclosure can significantly expand the color gamut of the display system (the color gamut is enhanced to the REC2020 color gamut standard), while maintaining high efficiency of the display system and reducing chromatic aberration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
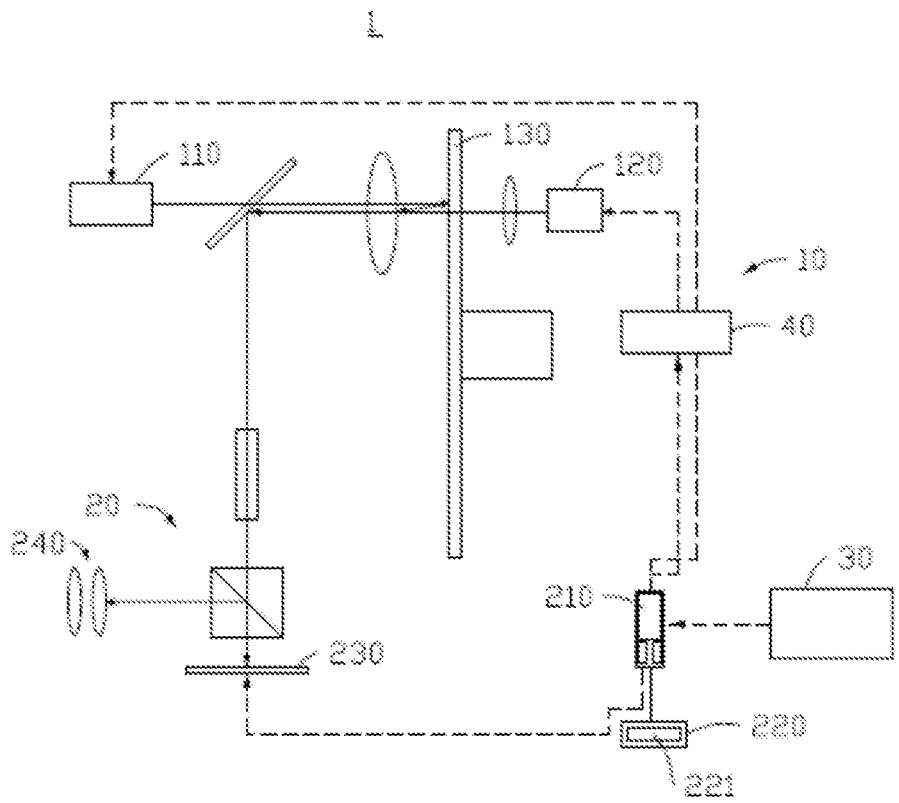
FIG. 1 is a structural diagram of a display system for dynamically adjusting a color gamut of the display system according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to make the above purpose, features and advantages of the present disclosure more understandable, the technical schemes in the forms of the present disclosure will be further described in combination with the accompanying drawings in the forms of the present disclosure. In order to make the description concise and clear, the same or similar elements will use the same reference sign in the following different forms. It should be noted that the forms described herein are merely part of the forms, rather than all forms of the present disclosure. Based on the forms of the present disclosure, all other forms obtained by those skilled in the art without creative work shall fall within a protection scope of the present disclosure.

Unless otherwise defined, all technical and scientific terms used herein have the same meaning as commonly understood by those skilled in the technical field of the present disclosure. The term "or/and" as used herein includes any and all combinations of one or more related listed items.

FIG. 1 is a schematic diagram of a structure of a display system according to a form of the present disclosure. The display system 1 includes a light source system 10 and an imaging system 20. The light source system 10 includes an excitation light source 110, a narrow-spectrum primary-color light source 120, and a wavelength conversion and light combination device 130. The short-wavelength excitation light outputted by the excitation light source 110 is directed to the wavelength conversion and light combination device 130, and is absorbed by the wavelength conversion and light combination device 130 to generate broad-spectrum primary-color light. The narrow-spectrum primary-color light outputted by the narrow-spectrum primary-color light source 120 is directed to the wavelength conversion and light combination device 130, and is combined with the broad-spectrum primary-color light at the wavelength conversion and light combining device 130. In this embodiment, the excitation light source 110 is a blue laser source, and the excitation light outputted by the excitation light source 110 is blue laser light. Wavelength conversion material and scattering material are provided at different regions of the wavelength conversion and light combination device 130. The wavelength conversion material include a red phosphor powder material and a green phosphor powder material. For ease of description, a region where the red phosphor material is provided is referred to as a "red light region", a region where the green phosphor material is provided is referred to as a "green light region", and a region where the scattering material is provided is referred to as a "blue light region". The red light region, the green light region and the blue light region alternately appear on an emergent path of the excitation light, so that light having three primary colors, (i.e., red fluorescence, green fluorescence and blue laser light) are emitted at the wavelength conversion and light combination device 130. In this embodiment, the narrow-spectrum primary-color light source 120 includes a red laser source and a green laser source. The red laser source and the green laser source output light having two primary colors, i.e., red laser light and green laser light in time sequence. The red laser light is directed to the wavelength conversion and light combination device 130 to be combined with the red fluorescence, and the green laser light is directed to the wavelength conversion and light combination device 130 to be combined with the green fluorescence. Therefore, the light source system 10 finally outputs illumination light having three primary colors i.e., red color, green color, and blue color, to the imaging system 20.

For ease of description, in a form of the present disclosure, red light R, green light G, and blue light G outputted by the light source system 10 are referred to as three primary-color lights of the light source. For an image data displayed by the three primary-color lights, each pixel point of the image data can be represented by the three primary colors, namely P(r, g, b). The red fluorescence r, green fluorescence g, blue laser light b, red laser light r', and green laser light b' outputted by the light source system 10 are referred to as five-primary-color light of the light source. For the image data displayed by the five-primary-color light, each pixel point of the image data can be represented by the five primary colors, namely P(r, g, b, r', b'). Descriptions such as color coordinates and luminance of the three primary colors of the light source system 10, color coordinates and luminance of the five primary colors of the light source system 10, color coordinates and luminance of the three primary colors of the pixel, and color coordinates and luminance of the five primary colors of the pixel will be described in the following. The color coordinates and the luminance of the three primary colors of the source system 10 refer to the color coordinates and the luminance of the three primary-color lights (red light R, green light G, and blue light G) outputted by the light source system 10 in a certain color space. The color coordinates and the luminance of the three primary colors of the pixel refer to the color coordinates and the luminance of the three primary colors of each pixel in a certain color space, in a frame of the image. The color coordinates and the luminance of the five primary colors of the light source system 10 refer to the color coordinates and the luminance of the five-primary-color light (red fluorescence r, green fluorescence g, blue laser light b, red laser light r', and green laser light b') in a certain color space. The color coordinates and the luminance of the five primary colors of the pixel refer to the color coordinates and the luminance of the five primary colors of each pixel in a certain color space, in a frame of the image.

In the aforementioned embodiment, a method for directing the excitation light and the narrow-spectrum primary-color light to the wavelength conversion and light combination device 130 and a method for directing the primary-color light from the wavelength conversion and light combination device 130 to the imaging system 20 can refer to the existing technology, which will not be described herein.

It can be understood that in other forms, the wavelength conversion and light combination device 130 can be separated into two devices, i.e., a wavelength conversion device and a light combination device. Those two devices can be arranged adjacent to each other or separated from each other, which will not be limited herein.

It can be understood that the light source system 10 may further include a filtering device, which may be integrated with or separated from the wavelength conversion and light combination device 130, which will not be limited herein.

It can be understood that in other forms, the light source system 10 may first generate blue light and yellow fluorescence, and then the yellow light is filtered to obtain red fluorescence and green fluorescence.

It can be understood that, in any case, the light source system 10 includes an excitation light source 110 and a narrow-spectrum primary-color light source 120. The excitation light outputted by the excitation light source 110 is processed, for example, through operations such as wavelength conversion, filtering, or scattering, so as to output blue light and broad-spectrum red light and green light. The narrow-spectrum primary-color light source 120 outputs at least one narrow-spectrum primary-color light. The at least one narrow-spectrum primary-color light is narrow-spectrum red light and/or green light. The blue light, the broad-spectrum red light and green light, and the narrow-spectrum red light and/or green light constitute polychromatic light having a light source more than three primary colors. The narrow-spectrum primary-color light and the corresponding broad-spectrum primary-color light are combined, such that the light source system output the three primary-color lights, i.e., red light, green light and blue light, to the imaging system. The three primary-color lights, i.e., red light, green light and blue light, constitutes the three primary colors of the light source.

The imaging system 20 includes a processing device 210, a storage device 220, and a spatial light modulation device 230. The processing device 210 is electrically connected to the storage device 220, the spatial light modulation device 230 and an image source 30. The processing device 210 receives an image signal from the image source 30. The spatial light modulation device 230 modulates the primary-color light outputted by the light source system 10 into image light carrying image information, under control of the processing device 210. The image light is outputted through a projection lens 240 and projected onto a screen (not shown) to form an image.

In this embodiment, a system 221 for dynamically adjusting a color gamut of a display system (hereinafter referred to as "dynamic adjustment system 221") is installed and running in the imaging system 20. Specifically, the dynamic adjustment system 221 may be divided into one or more modules, which are stored in the storage device 220 and executed by the processing device 210 to dynamically adjust the color gamut of the display system 1 based on the display content of the display system 1. Further, the processing device 210 obtains an original signal of an image in real time from the image source 30. For a specific frame of the image, the processing device 210 runs the dynamic adjustment system 221, and calculates a minimum luminance of the broad-spectrum primary-color light desired to display this frame of the image and a minimum luminance of the narrow-spectrum primary-color light desired to display this frame of the image based on the obtained original signal, and generates light source luminance signals that respectively controls the excitation light source 110 and narrow-spectrum primary-color light source 120. The light source luminance signals are outputted to a gamma corrector 40. Then, the corrected light source luminance signals are outputted to the excitation light source 110 and the narrow-spectrum primary-color light source 120, so as to adjust the luminance of the illumination light outputted by the excitation light source 110 and the narrow-spectrum primary-color light source 120. In this way, the five-primary-color light with different proportions is outputted to the spatial light adjustment device 230. On this basis, the processing device 210 further calculates a new color gamut based on the light source luminance signal and generates new color coordinates of the light source system 10, for example, color coordinates (R, G, B) of the new three primary colors. A color gamut conversion is performed on the original signal of each pixel point in this frame of the image by the new color coordinates of the light source system 10, to generate new color coordinates of each pixel point. The new color coordinates are outputted to the spatial light modulation device 230, to control the spatial light modulation device 230 to modulate the primary-color light outputted by the light source system 10 into image light carrying image information.

Figure 2:
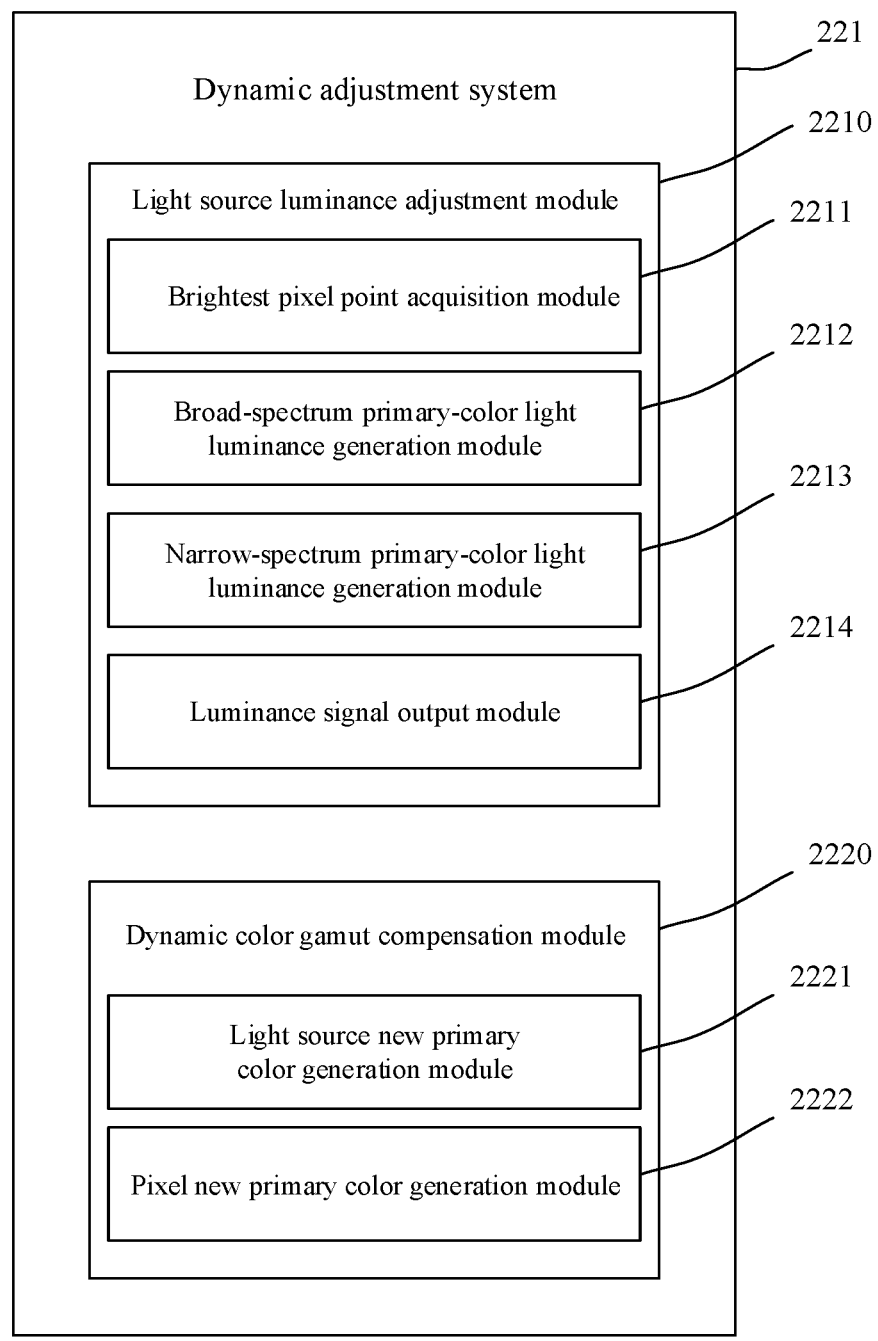
FIG. 2 is a module diagram of a system for dynamically adjusting a color gamut of the display system according to a form of the present disclosure.

With reference to FIG. 2, the dynamic adjustment system 221 can be divided into a light source luminance adjustment module 2210 and a dynamic color gamut compensation module 2220. The light source luminance adjustment module 2210 is configured to calculate a minimum luminance of the broad-spectrum primary-color light desired to display a frame of the image and a luminance of the narrow-spectrum primary-color light desired to display this frame of the image based on the obtained original signal of the frame of the image; to generate a light source luminance signal for controlling the excitation light source 110 and a light source luminance signal for controlling the narrow-spectrum primary-color light source 120; and to output the light source luminance signals to control the excitation light source 110 and the narrow-spectrum primary-color light source 120 respectively. The dynamic color gamut compensation module 2220 is configured to calculate a new color gamut based on a luminance control value of the broad-spectrum primary-color light and a luminance control value of the narrow-spectrum primary-color light, to generate new color coordinates of the light source system 10; to perform color gamut conversion on each pixel point in the frame of the image by the new color coordinates of the light source system 10, to generate a control signal under the new color gamut of each pixel point; and to output the control signal under the new color gamut of each pixel point to the spatial light modulation device 230, to control the spatial light modulation device 230 to modulate the primary-color light outputted by the light source system 10 into image light carrying image information. The light source luminance adjustment module 2210 may be further divided into a brightest pixel point acquisition module 2211, a broad-spectrum primary-color light luminance generation module 2212, a narrow-spectrum primary-color light luminance generation module 2213, and a luminance signal output module 2214. The dynamic color gamut compensation module 2220 may be further divided into a light source new primary color generation module 2221 and a pixel new primary color generation module 2222. It should be noted that the module described in the present disclosure is a program segment that can complete a specific function, and is more suitable than a program to describe an execution process of the software in the display system 1. The detailed functions of each module will be described with reference to the flowchart shown in FIG. 3.

Figure 3:
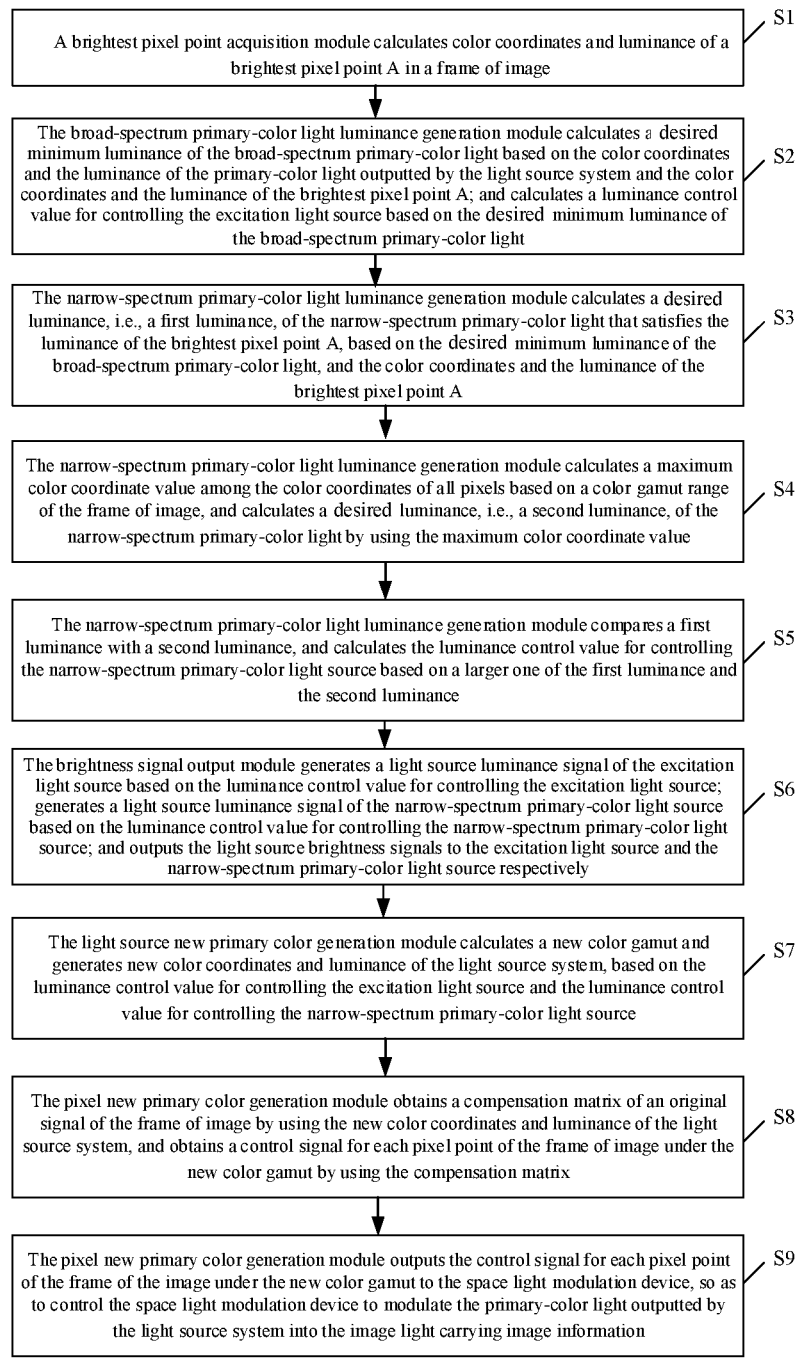
FIG. 3 is a flowchart of a method for dynamically adjusting a color gamut of a display system according to a first form of the present disclosure.
Figure 4:
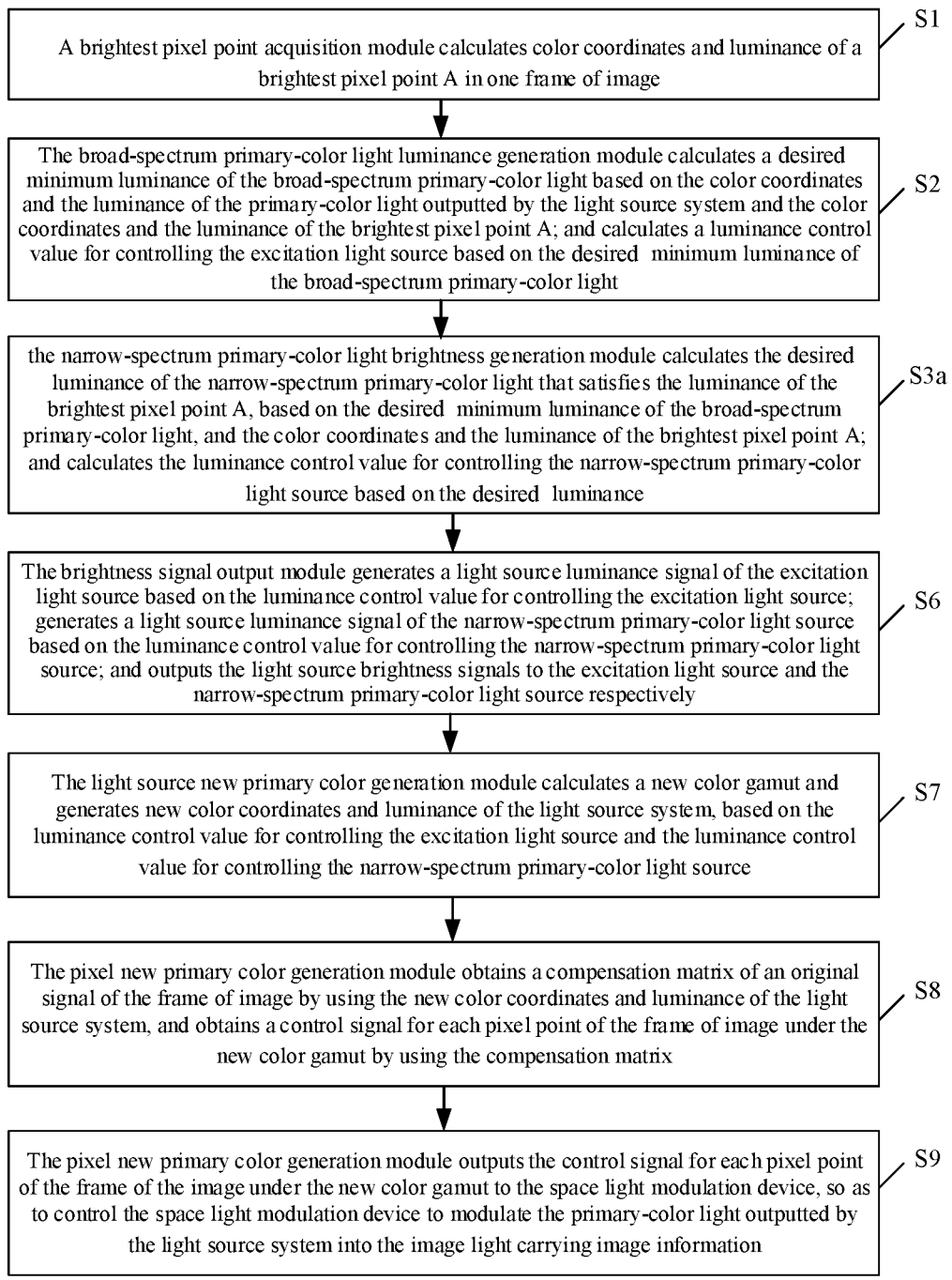
FIG. 4 is a flowchart of a method for dynamically adjusting a color gamut of a display system according to a second form of the present disclosure.
Figure 5:
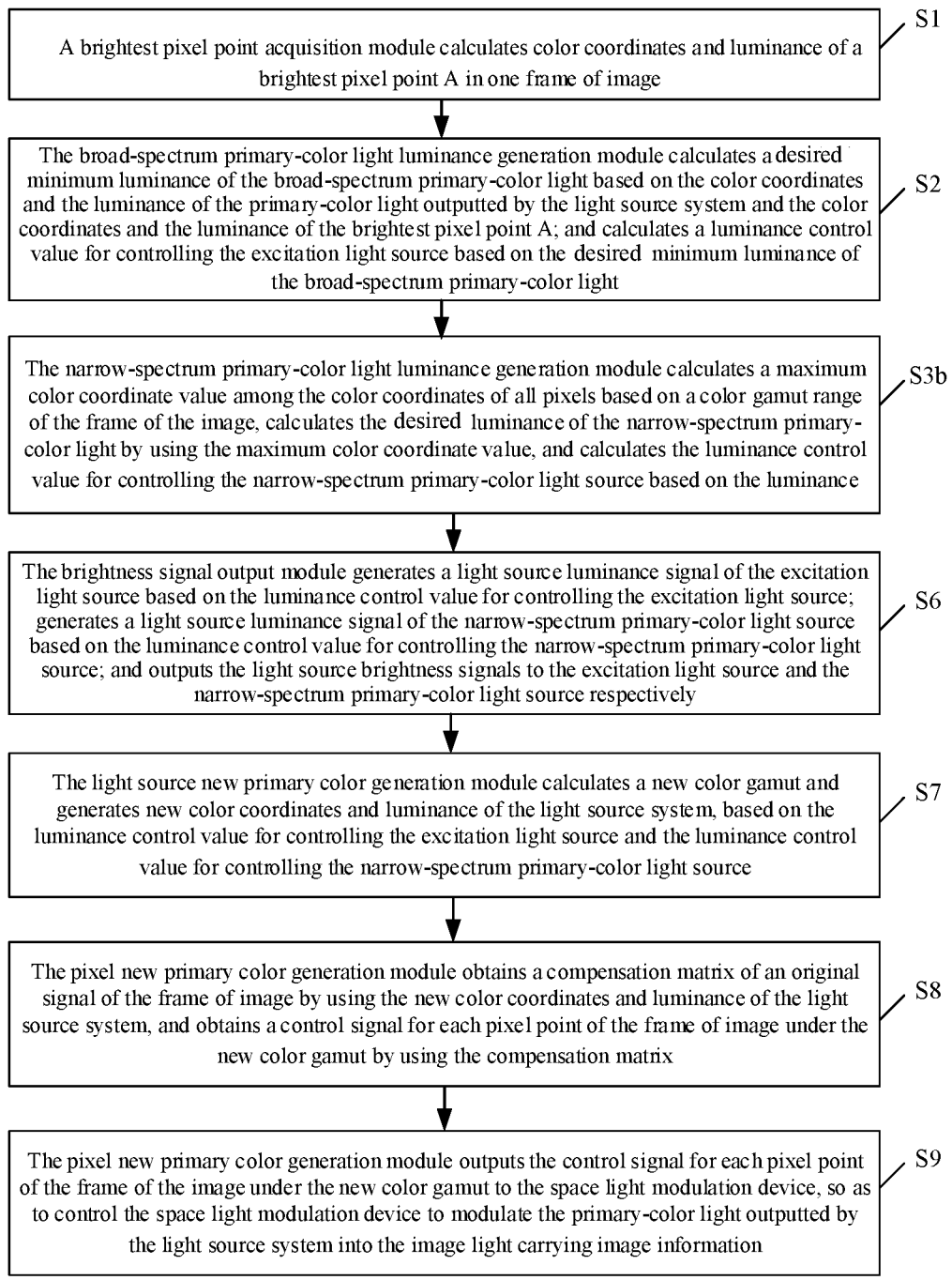
FIG. 5 is a flowchart of a method for dynamically adjusting a color gamut of a display system according to a third form of the present disclosure.

FIG. 3 is a flowchart of a method for dynamically adjusting a color gamut of the display system according to a form of the present disclosure. The method can be implemented by using the display system 1 shown in FIG. 1. The method for dynamically adjusting the color gamut of the display system will be described in detail in the following in combination with the display system 1.

First, at step S1, the brightest pixel point acquisition module 2211 calculates color coordinates (x, y) and luminance $Y_{max}$ of a pixel point A (hereinafter referred to as "brightest pixel point A") having a maximum luminance in a frame of the image. Specifically, the color coordinates and the luminance of the brightest pixel point A in a frame of the image can be calculated and obtained by an algorithm for calculating a maximum value.

At step S2, the broad-spectrum primary-color light luminance generation module 2212 calculates a desired minimum luminance of the broad-spectrum primary-color light based on the color coordinates and the luminance of the primary-color light outputted by the light source system 10 and the color coordinates and the luminance of the brightest pixel point A; and calculates a luminance control value for controlling the excitation light source 110 based on the desired minimum luminance of the broad-spectrum primary-color light.

In an embodiment, the excitation light source 110 is blue laser light, and the blue laser light is processed to obtain broad-spectrum red-green fluorescence and narrow-spectrum blue laser light. The broad-spectrum primary-color light luminance generation module 2212 calculates a desired minimum luminance of the red-green fluorescence; and generates a luminance control value of the excitation light source 110 based on the desired minimum luminance value of the red-green fluorescence, to control an intensity of the blue laser light outputted by the excitation light source 110 and further control an intensity of red-green fluorescence and blue laser light outputted by the light source system 10.

At step S3, the narrow-spectrum primary-color light luminance generation module 2213 calculates a desired luminance (i.e., a first luminance) of the narrow-spectrum primary-color light that satisfies the luminance of the brightest pixel point A, based on the desired minimum luminance of the broad-spectrum primary-color light, and the color coordinates and the luminance of the brightest pixel point A.

In an embodiment, the narrow-spectrum primary-color light source 120 includes a red-green laser source. Thus, the narrow-spectrum primary-color light luminance generation module 2213 calculates a desired luminance of the red laser light and a desired luminance of the green laser light. Further, in an embodiment, the luminance may be the desired minimum luminance, or the desired maximum luminance, or a value between the minimum luminance and the maximum luminance.

At step S4, the narrow-spectrum primary-color light luminance generation module 2213 calculates a maximum color coordinate value among the color coordinates of all pixel points based on a color gamut range of the frame of the image, that is, the color coordinates of each pixel point; and calculates the desired luminance, i.e., a second luminance, of the narrow-spectrum primary-color light by the maximum color coordinate value. Specifically, in an embodiment, the narrow-spectrum primary-color light luminance generation module 2213 calculates a maximum of an x value corresponding to a red primary-color light and a maximum of a y value corresponding to the green primary-color light in all pixel points; and then calculates a luminance (i.e., a second luminance) of the red-green laser light that the narrow-spectrum primary-color light source 120 needs to output, based on the maximum of the x value and the maximum of the y value. Similarly, in an embodiment, the luminance may be a desired minimum luminance (e.g., a required minimum luminance), or a desired maximum luminance (e.g., a required minimum luminance), or a value between the desired minimum luminance and the desired maximum luminance.

At step S5, the narrow-spectrum primary-color light luminance generation module 2213 compares a first luminance with a second luminance, and calculates the luminance control value for controlling the narrow-spectrum primary-color light source 120 based on a larger one of the first luminance and the second luminance.

At step S6, the luminance signal output module 2214 generates a light source luminance signal of the excitation light source 110 based on the luminance control value for controlling the excitation light source 110; generates a light source luminance signal of the narrow-spectrum primary-color light source 120 based on the luminance control value for controlling the narrow-spectrum primary-color light source 120; and outputs the light source luminance signals to the excitation light source 110 and the narrow-spectrum primary-color light source 120 respectively to adjust the luminance of the illumination light outputted by the excitation light source 110 and the narrow-spectrum primary-color light source 120. In this way, five-primary-color light with different proportions is generated and outputted to the spatial light modulation device 230.

At step S7, the light source new primary color generation module 2221 calculates a new color gamut to generate new color coordinates and luminance of the light source system 10, based on the luminance control value for controlling the excitation light source 110 and the luminance control value for controlling the narrow-spectrum primary-color light source 120.

At step S8, the pixel new primary color generation module 2222 obtains a compensation matrix of an original signal of the frame of the image by using the new color coordinates and luminance of the light source system 10, and obtains a control signal for each pixel point of the frame of the image under the new color gamut by using the compensation matrix.

At step S9, the pixel new primary color generation module 2222 outputs the control signal for each pixel point of the frame of the image under the new color gamut to the spatial light modulation device 230, so as to control the spatial light modulation device 230 to modulate the primary-color light outputted by the light source system 10 into the image light carrying image information.

In another embodiment, the aforementioned step S3 to step S5 can also be replaced by step S3a. At step S3a, the narrow-spectrum primary-color light luminance generation module 2213 calculates the desired luminance of the narrow-spectrum primary-color light that satisfies the luminance of the brightest pixel point A, based on the desired minimum luminance of the broad-spectrum primary-color light, and the color coordinates and the luminance of the brightest pixel point A; and calculates the luminance control value for controlling the narrow-spectrum primary-color light source 120 based on the desired luminance. In an embodiment, the luminance may be a desired minimum luminance, or a desired maximum luminance, or a value between the minimum luminance and the maximum luminance.

In another embodiment, the aforementioned step S3 to step S5 can also be replaced by step S3b. At step S3b, the narrow-spectrum primary-color light luminance generation module 2213 calculates a maximum color coordinate value among the color coordinates of all pixel points based on a color gamut range of the frame of the image, calculates the desired luminance of the narrow-spectrum primary-color light by using the maximum color coordinate value, and calculates the luminance control value for controlling the narrow-spectrum primary-color light source 120 based on the luminance. In an embodiment, the luminance may be a desired minimum luminance, or a desired maximum luminance, or a value between the minimum luminance and the maximum luminance.

An algorithm for generating a light source luminance signal and dynamically adjusting the color gamut of each pixel point in a frame of an image in forms of the present disclosure will be described in detail in the following.

Each frame of the image is adopted to different color spaces in different encoding formats. The common color space includes RGB encoding or YUV encoding. The display system needs to convert color of the image signal from a color space of a video signal to a color space of the display system. Taking the video signal encoded by RGB format as an example, the RGB signal uses three letters R, G, and B to define a proportion of three primary colors, i.e., red, green and blue colors. Generally, an RGB signal encoded with an 8-bit bit depth is used, and each primary color uses an 8-bit integer to represent a modulation depth of the three primary colors. 0 represents that this primary color is completely off, and 255 represents that this primary color is displayed at the highest luminance. Depending on different color gamut selected by the video signal, the RGB primary colors are also different. For example, three primary colors of RGB specified by the REC 2020 color gamut standard are respectively (0.708, 0.292, 0.2627), (0.17, 0.797, 0.6780), (0.131, 0.046, 0.0593) in the xyY coordinate system. The xyY color gamut coordinate system is defined by the CIE 1931 standard. Then, three primary colors of each pixel point of a frame of the image can be expressed as:

$$\begin{bmatrix} r_0 \\ g_0 \\ b_0 \end{bmatrix} = \begin{bmatrix} x_r & y_r & Y_r \\ x_g & y_g & Y_g \\ x_b & y_b & Y_b \end{bmatrix}.$$

Then, each pixel point (r, g, b) of this frame of the image is converted into a CIE 1931 color space as:

$$\begin{bmatrix} X \\ Y \\ Z \end{bmatrix} = C \begin{bmatrix} r \\ g \\ b \end{bmatrix},$$

where $$C = \begin{bmatrix} \frac{x_r}{y_r} Y_r & \frac{x_g}{y_g} Y_g & \frac{x_b}{y_b} Y_b \\ Y_r & Y_g & Y_b \\ \frac{1-x_r-y_r}{y_r} Y_r & \frac{1-x_g-y_g}{y_g} Y_g & \frac{1-x_b-y_b}{y_b} Y_b \end{bmatrix},$$

where the xyY coordinate system is a normalized representation of an XYZ coordinate system, and the conversion therebetween is as follows:

$$\begin{bmatrix} x \\ y \\ Y \end{bmatrix} = \begin{bmatrix} \frac{X}{X+Y+Z} \\ \frac{Y}{X+Y+Z} \\ Y \end{bmatrix}. \quad (1)$$

In a light source system 10 with red-green laser light, the light source system 10 outputs five-primary-color light, and the color coordinates and the luminance of the five-primary-color light are defined as:

$$\begin{bmatrix} r_0 \\ g_0 \\ b_0 \\ rl_0 \\ gl_0 \end{bmatrix} = \begin{bmatrix} x_r & y_r & Y_r \\ x_g & y_g & Y_g \\ x_b & y_b & Y_b \\ x_{rl} & y_{rl} & Y_{rl} \\ x_{gl} & y_{gl} & Y_{gl} \end{bmatrix}.$$

Herein, $r_0$, $g_0$, $b_0$, $rl_0$, and $gl_0$ respectively represent red fluorescence, green fluorescence, blue laser light, red laser light and green laser light in the five primary-color lights of the light source. Herein, $r_0$, $g_0$ and $b_0$ are all excited by the excitation light emitted by the excitation light source 110. Thus, the luminance of each of $r_0$, $g_0$ and $b_0$ is proportional to an output power of the excitation light source 110. When the output power of the excitation light source 110 decreases, the luminance of each of $r_0$, $g_0$ and $b_0$ will also decrease in the same proportion. Therefore, the luminance of $r_0$, $g_0$ and $b_0$ is determined by the same luminance control quantity $d_p$. In a single-chip projection system, the three primary colors (i.e., red color, green color, and blue color) are separated in time sequence. Thus, the luminance of each of $r_0$, $g_0$ and $b_0$ can be individually controlled, but high-speed light source driving is desired. In this embodiment, a case where the luminance of each of $r_0$, $g_0$ and $b_0$ can be individually controlled is temporarily not considered. For the red laser light $rl_0$ and green laser light $gl_0$ outputted by the narrow-spectrum primary-color light source 120, the luminance of each of $rl_0$ and $gl_0$ can be individually controlled, and the luminance control quantities corresponding to $rl_0$ and $gl_0$ are respectively $d_r$ and $d_g$.

The pixel point with the maximum luminance in a frame of the image determines the power desired to be outputted by the light source system, so it can provide that all pixel points can achieve a correct luminance. The pixel point with the maximum luminance in a frame of the image can be obtained by an algorithm for calculating a maximum value, which will not be further described herein.

The brightest pixel point A is defined as: $[x_{max}\ y_{max}\ Y_{max}]$, and the coordinate value of the brightest pixel point A in the CIE 1931 color space is jointly determined by the five-primary-color light of the light source as:

$$\begin{bmatrix} X_{max} \\ Y_{max} \\ Z_{max} \end{bmatrix} = \begin{bmatrix} (X_r r_{max} + X_g g_{max} + X_b b_{max})d_p + X_{rl} r_{max} d_r + X_{gl} g_{max} d_g \\ (Y_r r_{max} + Y_g g_{max} + Y_b b_{max})d_p + Y_{rl} r_{max} d_r + Y_{gl} g_{max} d_g \\ (Z_r r_{max} + Z_g g_{max} + Z_b b_{max})d_p + Z_{rl} r_{max} d_r + Z_{gl} g_{max} d_g \end{bmatrix} \quad (2)$$

In the formula (2), the XYZ values with subscripts are variants of xyY values according to the formula (1). Each of $d_p$, $d_r$ and $d_g$ is a corresponding luminance control quantity. $r_{max}$, $g_{max}$ and $b_{max}$ are new color coordinates of the three-primary-color RGB of the brightest point under the luminance control quantity $d_p$, $d_r$ and $d_g$. $d_r$, $d_g$, $r_{max}$, $g_{max}$ and $b_{max}$ are all unknown. In this case, six unknowns will be solved by the three equations in the formula (2), which have infinite solutions. Therefore, the following restriction conditions may be considered:

$r_{max} \in [0,1]$
$g_{max} \in [0,1]$
$b_{max} \in [0,1]$
$d_p \in [0,1]$
$d_r \in [0,1]$
$d_g \in [0,1]$.

When the luminance of the brightest pixel point A is maintained, a reduced (e.g., minimized) proportion of broad-spectrum primary-color light, i.e., a reduced (e.g., minimized) proportion of red-green fluorescence in this embodiment, is obtained. That is, min ($d_p$) that satisfies the aforementioned restriction conditions is obtained.

After elimination of the formula (2), $d_p$ can be expressed as:

$$d_p = \frac{A}{Br_{max} + Cg_{max} + Db_{max}}, \quad (3)$$

where $A = (X_{max}Y_{rl} - X_{rl}Y_{max})(Z_{gl}Y_{rl} - Z_{rl}Y_{gl}) - (X_{gl}Y_{rl} - X_{rl}Y_{gl})(Z_{max}Y_{rl} - Z_{rl}Y_{max})$ $B = (X_r Y_{rl} - X_{rl} Y_r)(Z_{gl} Y_{rl} - Z_{rl} Y_{gl}) - (Z_r Y_{rl} - Z_{rl} Y_r)(X_{gl} Y_{rl} - X_{rl} Y_{gl})$ $C = (X_g Y_{rl} - X_{rl} Y_g)(Z_{gl} Y_{rl} - Z_{rl} Y_{gl}) - (Z_g Y_{rl} - Z_{rl} Y_g)(X_{gl} Y_{rl} - X_{rl} Y_{gl})$ $D = (X_b Y_{rl} - Y_b X_{rl})(Z_{gl} Y_{rl} - Z_{rl} Y_{gl}) - (Z_b Y_{rl} - Z_{rl} Y_b)(X_{gl} Y_{rl} - X_{rl} Y_{gl}).$ The min(dp) is equivalent to max ($Br_{max} + Cg_{max} + Db_{max}$), and the denominator in the formula (3) is a linear function. Thus, when the denominator in the formula (3) takes the maximum:

$$r_{max} = \begin{cases} 0 & B < 0 \\ 1 & B > 0 \end{cases}$$

$$g_{max} = \begin{cases} 0 & C < 0 \\ 1 & C > 0 \end{cases}$$

$$b_{max} = \begin{cases} 0 & D < 0 \\ 1 & D > 0 \end{cases}$$

The $d_p$ can be calculated by the formula (3), and the minimum values of $d_r$ and $d_g$ can be calculated by substituting $d_p$ into the formula (2). According to $d_p$, the minimum luminance of red-green fluorescence can be obtained, and the luminance control value of red-green fluorescence can be calculated. According to $d_r$ and $d_g$, the minimum luminance (first luminance) of the red-green laser light can be obtained, and the luminance control value of the red-green laser light can be calculated. $d_r$ and $d_g$ can take the minimum values to save energy. In other forms, as desired, $d_r=1$ and $d_g=1$, so that the largest color gamut can be obtained. The maximum color gamut envelope can be calculated based on color gamut statistics of this frame of the image, so as to obtain the minimum luminance (second luminance) of red-green laser light. The first luminance is compared with the second luminance to obtain the larger one therebetween, thereby finally obtaining the luminance control value of red-green laser light. When the luminance control value of red-green fluorescence and the luminance control value of red-green laser light are known, the new color gamut of the light source system 10 can be calculated according to the following formula:

$$\begin{bmatrix} R_o'' \\ G_o'' \\ B_o'' \end{bmatrix} = \begin{bmatrix} X_r d_p + X_{rl} d_r & Y_r d_p + Y_{rl} d_r & Z_r d_p + Z_{rl} d_r \\ X_g d_p + X_{gl} d_g & Y_g d_p + Y_{gl} d_g & Z_r d_p + Z_{gl} d_g \\ X_b d_p & Y_b d_p & Z_b d_p \end{bmatrix}.$$

The dynamically calculated color gamut will be used to compensate color of an image screen, so that the screen can obtain a correct color in a new color gamut obtained by a new light source proportion.

Specifically, based on the luminance control value of each primary color of the light source system 10, a new color gamut can be calculated. The color gamut is determined based on the color coordinates and luminance of the primary-color light corresponding to respective color components that can be modulated by the spatial light modulation device 230. For example, the spatial light modulation device processes red primacy-color light, green primacy-color light, and blue primacy-color light respectively in three time sequences. Then, the color gamut that the display system 1 can represent is determined by the color coordinates and luminance of the illumination light outputted by the light source system 10 in the three time sequences. If the illumination light in one or some of the color time sequences is combined by multiple-primary-color light, the primary-color light representing the color gamut in the color time sequence is determined by the total color coordinates and the total luminance of the combined primary-color light. For example, in a frame of the image, the red color sequence consists of red fluorescence with a relative peak luminance of a % and red laser light with a relative peak luminance of b %. Thus, the primary-color light determined by the red color sequence is determined by the color coordinates and luminance of the illumination light obtained by combining a % red fluorescence with b % red laser light. Therefore, the color coordinates of the new combined three-primary-color RGB of the light source system 10 can be obtained, based on the luminance and color coordinates of each primary-color light outputted by the light source system 10.

Further, a compensation matrix of an original signal of the frame of the image is obtained by the new color coordinates and the luminance of the light source system 10, and new color coordinates of each pixel point of this frame of the image is obtained by using the compensation matrix. That is, a control signal under the new color gamut of each pixel point is obtained. In this embodiment, the compensation matrix is determined by the following method.

In CIE 1937, an absolute color and color luminance that any human eye can distinguish are defined by a three-dimensional vector. The absolute color and color luminance do not change with the color gamut. Three primary colors of display system 1 satisfy the following formula:

$$\begin{bmatrix} r_0' \\ g_0' \\ b_0' \end{bmatrix} = \begin{bmatrix} x_r' & y_r' & Y_r' \\ x_g' & y_g' & Y_g' \\ x_b' & y_b' & Y_b' \end{bmatrix}$$

To display the color represented by an original image signal in the display system 1, the luminance of each of the three primary colors displayed by the display system 1 shall satisfy the following formula:

$$\begin{bmatrix} X \\ Y \\ Z \end{bmatrix} = C' \begin{bmatrix} r' \\ g' \\ b' \end{bmatrix},$$

where $$\begin{bmatrix} r' \\ g' \\ b' \end{bmatrix}$$

represents a modulation signal intensity of the three primary colors in the display system 1, and C' is:

$$C' = \begin{bmatrix} \frac{x_r'}{y_r'} Y_r' & \frac{x_g'}{y_g'} Y_g' & \frac{x_b'}{y_b'} Y_b' \\ Y_r' & Y_g' & Y_b' \\ \frac{1 - x_r' - y_r'}{y_r'} Y_r' & \frac{1 - x_g' - y_g'}{y_g'} Y_g' & \frac{1 - x_b' - y_b'}{y_b'} Y_b' \end{bmatrix}.$$

In this way, a relationship from the color gamut space of the original signal of the input image to the modulation signal of the three-primary-color of the display system 1 can be defined as:

$$\begin{bmatrix} r' \\ g' \\ b' \end{bmatrix} = C'^{-1} C \begin{bmatrix} r \\ g \\ b \end{bmatrix}$$

Herein, a principle of color conversion is illustrated by taking the three-primary-color system as an example. For a projection system using four primary colors or five primary colors, C' is a matrix of 4×3 or 5×3, and a determinant of its pseudo-inverse matrix is equal to zero. Thus, there are infinite solutions for the conversion from XYZ space to primary-color space. $C'^{-1}$ is a conversion matrix from the XYZ space to the primary-color space. This conversion matrix can be solved by adding a restriction condition. For example, white light is increased or maximized in a light source system using a four-segment color wheel RGBW, and the luminance of each primary color is distributed as evenly as possible. The correction for the color of the display system 1 is actually a correction for C'. The color coordinates and luminance of each primary-color light of the display system 1 are accurately measured to generate accurate C', which is the basis for ensuring an accuracy of the color displayed by the display system 1.

A panel control chip provided by vendors of the existing mainstream display panel (i.e., spatial light modulation device) integrates color management modules, such as color gamut conversion and gamma correction, to perform color management functions. These color management modules use a register to store the color conversion matrix. For an inputted color signal at each pixel point, a color space of the inputted signal is converted into the color space of the display system by using the color conversion matrix. Therefore, in this embodiment, the improvement of the existing mainstream display system may include: performing a dynamic color gamut compensation on a frame of the image before this frame of the image reaches the panel control chip. Herein, the color conversion matrix recorded in the panel control chip can be set as:

$$T=C'^{-1}C$$

Herein, C' is the conversion matrix from an rgb space to an XYZ space under the three primary colors, where the conversion matric is recorded by the panel control chip; and C is the conversion matrix from the original signal of the input video or image to the XYZ space. When the fluorescence and laser light of the light source system 10 are modulated based on the light source luminance signal, in order to make the rgb value converted by the panel control chip meet the combination of the new dynamically generated color gamut and maintain the color unchanged, that is, to make the XYZ coordinates of color remain unchanged, the signal inputted to the panel control chip can be obtained by converting the original inputted signal (i.e., original signal) in following formula:

$$\begin{bmatrix} r''' \\ g''' \\ b''' \end{bmatrix} = C^{-1}C'C''^{-1}C\begin{bmatrix} r \\ g \\ b \end{bmatrix}$$

Herein, C is a conversion matrix corresponding to a color gamut change of the original signal of the image; C' is a color gamut conversion matrix recorded in the panel control chip; C" is a conversion matrix of a new dynamic color gamut, that is, the compensation matrix; and $$\begin{bmatrix} r''' \\ g''' \\ b''' \end{bmatrix}$$

is the compensated signal inputted to the panel control chip. Using the above formula, it can be provided that the color displayed by the display system 1 does not change when the color gamut of the light source system 10 is modulated.

It should be understood that although the aforementioned forms merely described a case where the light source system 10 outputs five-primary-color illumination light, in other forms, it is also possible that the light source system 10 outputs only four-primary-color illumination light, such as only red fluorescence r, green fluorescence g, blue laser light b and red laser light r', or only red fluorescence r, green fluorescence g, blue laser light b, and green laser light g'. Further, according to the requirements in a specific case, the excitation light emitted by the excitation light source 110 of the light source system 10 is processed to output primary-color light that may include only one broad-spectrum primary-color light, such as red fluorescence or green fluorescence.

In summary, for the system and method for dynamically adjusting the display system, and the display system according to the forms of the present disclosure, on the one hand, the excitation light with better monochromaticity and broad-spectrum fluorescence are combined to form new primary-color light, thereby expanding the color gamut of the display system. On the other hand, the luminance of the brightest pixel point in the image is used to calculate the desired minimum luminance of the broad-spectrum primary-color light. Thus, the luminance of the broad-spectrum primary-color light is improved while maintaining the luminance of the image, so that the color gamut of the image can be expanded to the greatest extent. In addition, new color coordinates of the light source system is calculated by using the modulated luminance of primary-color illumination light, and a compensation matrix of the original signal of this frame of the image is calculated by using the new color coordinate of the light source system, to compensate the original signal of this frame of the image to generate a control signal of each pixel point of the compensated image. The control signal is used to control output of the spatial light modulation device, thereby dynamically compensating chromatic aberration of each frame due to the change of color gamut according to the difference of each frame of the image. Therefore, the system and method for dynamically adjusting the color gamut of the display system, and the display system according to the forms of the present disclosure can significantly expand the color gamut of the display system (the color gamut is enhanced to reach the REC2020 color gamut standard), while maintaining high efficiency of the display system and reducing chromatic aberration.

The aforementioned forms are merely used to illustrate rather than limit the technical schemes of the present disclosure. Although the present disclosure has been described in detail with reference to the aforementioned forms, it should be understood by those skilled in the art that any modifications or equivalent replacements to the technical schemes of the present disclosure will not depart from a scope of the technical schemes of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for dynamically adjusting a color gamut of a display system, wherein the display system comprises a light source system and an imaging system, the light source system comprises an excitation light source and a narrow-spectrum primary-color light source, the imaging system comprises a spatial light modulation device and the system for dynamically adjusting the color gamut of the display system, wherein the excitation light source emits excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system, and wherein the system for dynamically adjusting the color gamut of the display system comprises:

a light source luminance adjustment module comprising:
a brightest pixel point acquisition module configured to calculate color coordinates and luminance of a pixel point with a maximum luminance in a frame of an image;
a broad-spectrum primary-color light luminance generation module configured to calculate a desired minimum luminance of the broad-spectrum primary-color light based on color coordinates and luminance of the primary-color light outputted by the light source system and the color coordinates and the luminance of the pixel point with the maximum luminance, and to calculate a luminance control value for controlling the excitation light source based on the minimum luminance;
a narrow-spectrum primary-color light luminance generation module configured to calculate a desired luminance of the narrow-spectrum primary-color light based on the desired minimum luminance of the broad-spectrum primary-color light, and to calculate a luminance control value for controlling the narrow-spectrum primary-color light source based on the desired luminance of the narrow-spectrum primary-color light; and
a luminance signal output module configured to generate a light source luminance signal of the excitation light source based on the luminance control value of the broad-spectrum primary-color light, and generate a light source luminance signal of the narrow-spectrum primary-color light source based on the luminance control value of the narrow-spectrum primary-color light; and to output the light source luminance signals to the excitation light source and the narrow-spectrum primary-color light source respectively to adjust luminance of light emitted by the excitation light source and luminance of light emitted by the narrow-spectrum primary-color light source.

2. The system according to claim 1, further comprising a dynamic color gamut compensation module configured to:
calculate a new color gamut and generate new color coordinates of the light source system based on the luminance control value for controlling the excitation light source and the luminance control value for controlling the narrow-spectrum primary-color light source; and
perform a color gamut conversion on each pixel point of the frame of the image using the new color coordinates of the light source system to generate a control signal for each pixel point under the new color gamut and output the control signal to the spatial light modulation device, so as to control the spatial light modulation device to modulate three primary-color lights of the light source into image light carrying image information.

3. The system according to claim 2, wherein the narrow-spectrum primary-color light luminance generation module is further configured to:
calculate a desired luminance of the narrow-spectrum primary-color light in a case that the luminance of the pixel point with the maximum luminance is satisfied based on the desired minimum luminance of the broad-spectrum primary-color light and the color coordinates and the luminance of the pixel point with the maximum luminance; and
calculate the luminance control value of the narrow-spectrum primary-color light source based on the desired luminance of the narrow-spectrum primary-color light.

4. The system according to claim 2, wherein the narrow-spectrum primary-color light luminance generation module is further configured to:
calculate a maximum color coordinate value among color coordinates of all pixel points based on a color gamut range of the frame of the image;
calculate a desired luminance of the narrow-spectrum primary-color light based on the maximum color coordinate value; and calculate the luminance control value of the narrow-spectrum primary-color light source based on the desired luminance of the narrow-spectrum primary-color light.

5. The system according to claim 2, wherein the narrow-spectrum primary-color light luminance generation module is further configured to:
calculate a desired first luminance of the narrow-spectrum primary-color light in a case that the luminance of the pixel point with the maximum luminance is satisfied, based on the desired minimum luminance of the broad-spectrum primary-color light and the color coordinates and the luminance of the pixel point with the maximum luminance;
calculate a maximum color coordinate value among color coordinates of all pixel points based on a color gamut range of the frame of the image;
calculate a desired second luminance of the narrow-spectrum primary-color light based on the maximum color coordinate value; and
compare the first luminance and the second luminance and calculate the luminance control value of the narrow-spectrum primary-color light source based on a greater one of the first luminance and the second luminance.

6. The system according to claim 2, wherein the dynamic color gamut compensation module comprises:
a light source new primary color generation module configured to calculate a new color gamut and generate new color coordinates of the light source system based on the luminance control value for controlling the excitation light source and the luminance control value for controlling the narrow-spectrum primary-color light source;
a pixel new primary color generation module configured to obtain a compensation matrix for color coordinates of pixel points in the frame of the image based on the new color coordinates of the light source system, obtain a control signal for each pixel point of the frame of the image under the new color gamut based on the compensation matrix, and output the control signal for each pixel point under the new color gamut to the spatial light modulation device, so as to control the spatial light modulation device to modulate the primary-color light output by the light source system into the image light carrying image information.

7. The system according to claim 1, wherein in a process of calculating the desired luminance of the narrow-spectrum primary-color light, the luminance is a desired minimum luminance or a desired maximum luminance.

8. The system according to claim 1, wherein the excitation light source is blue laser light, the blue laser light is processed so that red fluorescence, green fluorescence, and blue laser light are output, and the narrow-spectrum primary-color light comprises red laser light and/or green laser light.

9. A method for dynamically adjusting a color gamut of a display system, wherein the display system comprises a light source system and an imaging system, the light source system comprising an excitation light source and a narrow-spectrum primary-color light source, the imaging system comprising a spatial light modulation device, wherein the excitation light source emits excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system, and wherein the method comprises:
calculating color coordinates (x, y) and luminance of a pixel point with a maximum luminance $Y_{max}$ in a frame of an image;
calculating a desired minimum luminance of the broad-spectrum primary-color light based on color coordinates and luminance of primary-color light outputted by the light source system and the color coordinates and the luminance of the pixel point with the maximum luminance, and calculating a luminance control value for controlling the excitation light source based on the desired minimum luminance of the broad-spectrum primary-color light;
calculating a desired luminance of the narrow-spectrum primary-color light based on the desired minimum luminance of the broad-spectrum primary-color light, and calculating a luminance control value for controlling the narrow-spectrum primary-color source based on the desired luminance of the narrow-spectrum primary-color light; and
generating a light source luminance signal of the excitation light source based on the luminance control value for controlling the excitation light source, and generating a light source luminance signal of the narrow-spectrum primary-color light source based on the luminance control value for controlling the narrow-spectrum primary-color light source, and outputting the light source luminance signals to the excitation light source and the narrow-spectrum primary-color light source respectively to adjust luminance of light emitted by the excitation light source and luminance of light emitted by the narrow-spectrum primary-color light source.

10. The method according to claim 9, wherein the calculating the desired luminance of the narrow-spectrum primary-color light comprises:
calculating a desired luminance of the narrow-spectrum primary-color light in a case that the luminance of the pixel point with the maximum luminance is satisfied, based on the desired minimum luminance of the broad-spectrum primary-color light and the color coordinates and the luminance of the pixel point with the maximum luminance, and calculating a luminance control value for controlling the narrow-spectrum primary-color light source based on the desired luminance of the narrow-spectrum primary-color light.

11. The method according to claim 9, wherein the calculating the desired luminance of the narrow-spectrum primary-color light comprises:
calculating a maximum color coordinate value among color coordinates of all pixel points based on a color gamut range of the frame of the image, calculating a desired luminance of the narrow-spectrum primary-color light based on the maximum color coordinate value, and calculating the luminance control value for controlling the narrow-spectrum primary-color light source based on the desired luminance of the narrow-spectrum primary-color light.

12. The method according to claim 9, wherein the calculating the desired luminance of the narrow-spectrum primary-color light comprises:
calculating a desired first luminance of the narrow-spectrum primary-color light in a case that the luminance of the pixel point with the maximum luminance is satisfied, based on the desired minimum luminance of the broad-spectrum primary-color light and the color coordinates and the luminance of the pixel point with the maximum luminance;

calculating a maximum color coordinate value among color coordinates of all pixel points based on a color gamut range of the frame of the image, and calculating a desired second luminance of the narrow-spectrum primary-color light based on the maximum color coordinate value; and comparing the first luminance and the second luminance, and calculating the luminance control value for controlling the narrow-spectrum primary-color light source based on a greater one of the first luminance and the second luminance.

13. The method according to claim 9, further comprising:
calculating a new color gamut and generating new color coordinates of the light source system based on the luminance control value for controlling the excitation light source and the luminance control value for controlling the narrow-spectrum primary-color light source; and generating a control signal for each pixel point under the new color gamut to the spatial light modulation device by using the new color coordinates of the light source system to perform a color gamut conversion on each pixel point of the frame of the image, so as to control the spatial light modulation device to modulate three primary-color lights of the light source into image light carrying image information.

14. The method according to claim 13, wherein the generating the control signal for each pixel point under the new color gamut comprises:
calculating the new color gamut and generating the new color coordinates of the light source system based on the luminance control value for controlling the excitation light source and the luminance control value for controlling the narrow-spectrum primary-color light source; and
obtaining a compensation matrix for color coordinates of pixel points in the frame of the image based on the new color coordinates of the light source system, obtaining a control signal for each pixel point in the frame of the image under the new color gamut based on the compensation matrix, and outputting the control signal for each pixel point under the new color gamut to the spatial light modulation device, so as to control the spatial light modulation device to modulate the primary-color light outputted by the light source system into the image light carrying image information.

15. The method according to claim 9, wherein in a process of calculating the desired luminance of the narrow-spectrum primary-color light, the luminance is a desired minimum luminance or a desired maximum luminance.

16. The method according to claim 9, wherein the excitation light source is blue laser light, the blue laser light is processed so that red fluorescence, green fluorescence, and blue laser light are output, and the narrow-spectrum primary-color light comprises red laser light and/or green laser light.

17. A display system, comprising a light source system and an imaging system, the light source system comprising an excitation light source and a narrow-spectrum primary-color light source, wherein the excitation light source outputs excitation light which is processed to output primary-color light including at least one broad-spectrum primary-color light, the narrow-spectrum primary-color light source outputs at least one narrow-spectrum primary-color light, and the narrow-spectrum primary-color light and corresponding broad-spectrum primary-color light are combined and outputted to the imaging system, and wherein the imaging system comprises a spatial light modulation device and a system for dynamically adjusting a color gamut of a display system, and wherein a method for dynamically adjusting the color gamut of the display system comprises:
a light source luminance adjustment module comprising:
a brightest pixel point acquisition module configured to calculate color coordinates and luminance of a pixel point with a maximum luminance in a frame of an image;
a broad-spectrum primary-color light luminance generation module configured to calculate a desired minimum luminance of the broad-spectrum primary-color light based on color coordinates and luminance of the primary-color light outputted by the light source system and the color coordinates and the luminance of the pixel point with the maximum luminance, and to calculate a luminance control value for controlling the excitation light source based on the minimum luminance;
a narrow-spectrum primary-color light luminance generation module configured to calculate a desired luminance of the narrow-spectrum primary-color light based on the desired minimum luminance of the broad-spectrum primary-color light, and to calculate a luminance control value for controlling the narrow-spectrum primary-color light source based on the desired luminance of the narrow-spectrum primary-color light; and
a luminance signal output module configured to generate a light source luminance signal of the excitation light source based on the luminance control value of the broad-spectrum primary-color light, and generate a light source luminance signal of the narrow-spectrum primary-color light source based on the luminance control value of the narrow-spectrum primary-color light; and to output the light source luminance signals to the excitation light source and the narrow-spectrum primary-color light source respectively to adjust luminance of light emitted by the excitation light source and luminance of light emitted by the narrow-spectrum primary-color light source.

18. The display system according to claim 17, wherein the light source luminance adjustment module further comprises a dynamic color gamut compensation module configured to:
calculate a new color gamut and generate new color coordinates of the light source system based on the luminance control value for controlling the excitation light source and the luminance control value for controlling the narrow-spectrum primary-color light source; and
perform a color gamut conversion on each pixel point of the frame of the image using the new color coordinates of the light source system to generate a control signal for each pixel point under the new color gamut and output the control signal to the spatial light modulation device, so as to control the spatial light modulation device to modulate three primary-color lights of the light source into image light carrying image information.

19. The display system according to claim 18, wherein the narrow-spectrum primary-color light luminance generation module is further configured to:
calculate a desired luminance of the narrow-spectrum primary-color light in a case that the luminance of the pixel point with the maximum luminance is satisfied based on the desired minimum luminance of the broad-spectrum primary-color light and the color coordinates and the luminance of the pixel point with the maximum luminance; and calculate the luminance control value of the narrow-spectrum primary-color light source based on the desired luminance of the narrow-spectrum primary-color light.

20. The system according to claim 18, wherein the narrow-spectrum primary-color light luminance generation module is further configured to:

calculate a maximum color coordinate value among color coordinates of all pixel points based on a color gamut range of the frame of the image;

calculate a desired luminance of the narrow-spectrum primary-color light based on the maximum color coordinate value; and calculate the luminance control value of the narrow-spectrum primary-color light source based on the desired luminance of the narrow-spectrum primary-color light.

\* \* \* \* \*